US012767484B2

(12) United States Patent
Li et al.

(10) Patent No.: US 12,767,484 B2
(45) Date of Patent: Oct. 20, 2026

(54) LOCATING FAILURE OF LANDING DOOR SAFETY CIRCUIT

(71) Applicant: Otis Elevator Company, Farmington, CT (US)

(72) Inventors: BiChun Li, Shanghai (CN); ShenHong Wang, Shanghai (CN); Fu Qi, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1499 days.

(21) Appl. No.: 17/373,955

(22) Filed: Jul. 13, 2021

(65) Prior Publication Data

US 2022/0017329 A1 Jan. 20, 2022

(30) Foreign Application Priority Data

Jul. 16, 2020 (CN) ........................ 202010685266.X

(51) Int. Cl.
*B66B 5/00* (2006.01)
*B66B 1/46* (2006.01)

(52) U.S. Cl.
CPC ............ *B66B 5/0031* (2013.01); *B66B 1/468* (2013.01); *B66B 5/0025* (2013.01)

(58) Field of Classification Search
CPC ...... B66B 5/0031; B66B 1/468; B66B 5/0025
See application file for complete search history.

(56) References Cited

U.S. PATENT DOCUMENTS 6,193,019 B1 * 2/2001 Sirigu ..................... B66B 13/22 187/391
2005/0098390 A1 * 5/2005 Angst ................... B66B 5/0018 187/247
2018/0086605 A1 * 3/2018 Saarela ................... B66B 13/22
2018/0111792 A1 * 4/2018 Schach ................... B66B 1/468
(Continued)

FOREIGN PATENT DOCUMENTS

CN 201761988 U 3/2011
CN 104192664 A 12/2014
(Continued)

OTHER PUBLICATIONS

European Search Report for Application No. 21185806.3, Aug. 25, 2023, 7 Pages.

(Continued)

*Primary Examiner* — Shawki S Ismail
(74) *Attorney, Agent, or Firm* — CANTOR COLBURN LLP

(57) ABSTRACT

A fault location unit of a landing door safety circuit includes: a fault collection circuit, which is disposed corresponding to the landing door locking fault monitoring module of the landing door safety circuit at a certain landing, and which is configured to collect a signal indicating landing door locking fault from only the landing door locking fault monitoring module at said certain landing and output a corresponding electrical level signal; and a fault sending component, which is electrically connected to the fault collection circuit in a one-to-one correspondence, and which is configured to send corresponding fault information containing landing information of the landing based on the received electrical level signal.

13 Claims, 4 Drawing Sheets

(56) References Cited

U.S. PATENT DOCUMENTS

| | | | | |
|---|---|---|---|---|
| 2019/0322490 | A1* | 10/2019 | Hovi | B66B 13/146 |
| 2020/0062543 | A1* | 2/2020 | Tracey | B66B 13/22 |
| 2021/0221644 | A1* | 7/2021 | Cao | B66B 1/06 |

FOREIGN PATENT DOCUMENTS

| | | | | |
|---|---|---|---|---|
| CN | 204150846 | U | 2/2015 | |
| CN | 105217395 | A | 1/2016 | |
| CN | 207293846 | U | 5/2018 | |
| CN | 109353923 | A | 2/2019 | |
| CN | 208732408 | U | 4/2019 | |
| CN | 208964310 | U | 6/2019 | |
| CN | 110203788 | A | 9/2019 | |
| CN | 110407039 | A | 11/2019 | |
| CN | 110884972 | A | 3/2020 | |
| CN | 210795422 | U * | 6/2020 | |
| EP | 3333110 | A1 * | 6/2018 | B66B 5/02 |
| FR | 2558278 | A1 | 7/1985 | |
| JP | 2008120471 | A | 5/2008 | |
| JP | 2009023820 | A | 2/2009 | |
| JP | 2009220999 | A | 10/2009 | |
| WO | 2008104632 | A1 | 9/2008 | |
| WO | 2010097404 | A1 | 9/2010 | |
| WO | 2013020934 | A1 | 2/2013 | |

OTHER PUBLICATIONS

European Search Report for Application No. 21185806.3, Nov. 29, 2021, 9 Pages.

Chinese Office Action for Application No. 202010685266.X, Issued May 15, 2024, 8 Pages.

* cited by examiner

LOCATING FAILURE OF LANDING DOOR SAFETY CIRCUIT

FOREIGN PRIORITY

This application claims priority to Chinese Patent Application No. 202010685266.X, filed Jul. 16, 2020, and all the benefits accruing therefrom under 35 U.S.C. § 119, the contents of which in its entirety are herein incorporated by reference.

TECHNICAL FIELD

The present disclosure pertains to the technical field of elevators, and relates to a fault location unit and a fault location system of a landing door safety circuit.

BACKGROUND

As an important component for ensuring safe operation of an elevator system, a landing door safety circuit is arranged in the elevator system according to corresponding industry standards. If a landing door locking fault occurs at a certain landing (for example, the landing door closed out of place, a mechanical lock hooking out of place, etc.), the landing door locking fault of the certain landing will cause the entire landing door safety circuit to fail, and an elevator controller will control an elevator car to stop running according to the failure of the landing door safety circuit to prevent the elevator system from running under unsafe conditions.

SUMMARY

According to an aspect of the present disclosure, a fault location unit of a landing door safety circuit is provided, wherein the landing door safety circuit comprises a plurality of landing door locking fault monitoring modules connected in series, each of which is disposed corresponding to each landing; wherein the fault location unit comprises: a fault collection circuit, which is disposed corresponding to the landing door locking fault monitoring module of the landing door safety circuit at a certain landing, and which is configured to collect a signal indicating landing door locking fault from only the landing door locking fault monitoring module at said certain landing and output a corresponding electrical level signal; and a fault sending component, which is electrically connected to the fault collection circuit in a one-to-one correspondence, and which is configured to send corresponding fault information containing landing information of the landing based on the received electrical level signal.

According to an additional or alternative embodiment, the fault sending component is implemented in hall call control panel at said certain landing.

According to an additional or alternative embodiment, the hall call control panel includes: a first port, which is configured to receive the electrical level signal from the fault collection circuit; a control module, which is configured to generate corresponding fault information containing landing information of the landing based on the received electrical level signal; and a communication module, which is configured to establish a communication connection with an elevator controller and send the fault information.

According to an additional or alternative embodiment, the fault location unit further includes a fault indicator disposed on the hall call control panel; wherein the control module is further configured to generate a corresponding signal for driving displaying of the fault indicator based on the received electrical level signal.

According to an additional or alternative embodiment, the fault location unit further includes: a second port which is configured to connect with the fault indicator.

According to an additional or alternative embodiment, each of the landing door locking fault monitoring modules includes a landing door switch assembly, as well as a first contact and a second contact electrically connected to both ends of the landing door switch assembly, wherein the second contact is closer to an output terminal of the landing door safety circuit than the first contact; wherein the fault collection circuit collects the signal indicating landing door locking fault from the second contact.

According to an additional or alternative embodiment, the fault collection circuit is implemented through a voltage adapter.

According to an additional or alternative embodiment, an electrical isolation device is disposed inside the fault collection circuit; wherein the fault collection circuit outputs the electrical level signal via the electrical isolation device.

According to an additional or alternative embodiment, the electrical isolation device is an optoelectronic coupler device or a relay.

According to an additional or alternative embodiment, a ground terminal inside the fault collection circuit is electrically connected to a first ground terminal and a second ground terminal.

According to another aspect of the present disclosure, a fault location system of a landing door safety circuit is provided, which includes: n anyone of the aforesaid fault location units, which are respectively disposed corresponding to the landing door locking fault monitoring modules of the landing door safety circuit at n landings, wherein n is an integer greater than or equal to 2; and an elevator controller, which is coupled to the n fault location units and receives fault information containing landing information sent by one of the fault location units; wherein the elevator controller is configured to determine the landing where the landing door locking fault occurs based on the fault information containing landing information.

In the fault location system according to an embodiment of the present disclosure, the elevator controller is further configured to be connected to a service diagnostic tool or a mobile terminal device and is capable of sending landing information of the landing door locking fault to the service diagnostic tool or the mobile terminal device.

The above features, operations and advantages of the present disclosure will become more apparent from the following description and accompanying drawings.

BRIEF DESCRIPTION OF THE DRAWINGS

The above and other objects and advantages of the present disclosure will become more complete and clear from the following detailed description in conjunction with the accompanying drawings, wherein identical or similar elements are denoted by identical reference numerals.

DETAILED DESCRIPTION

Figure 1:
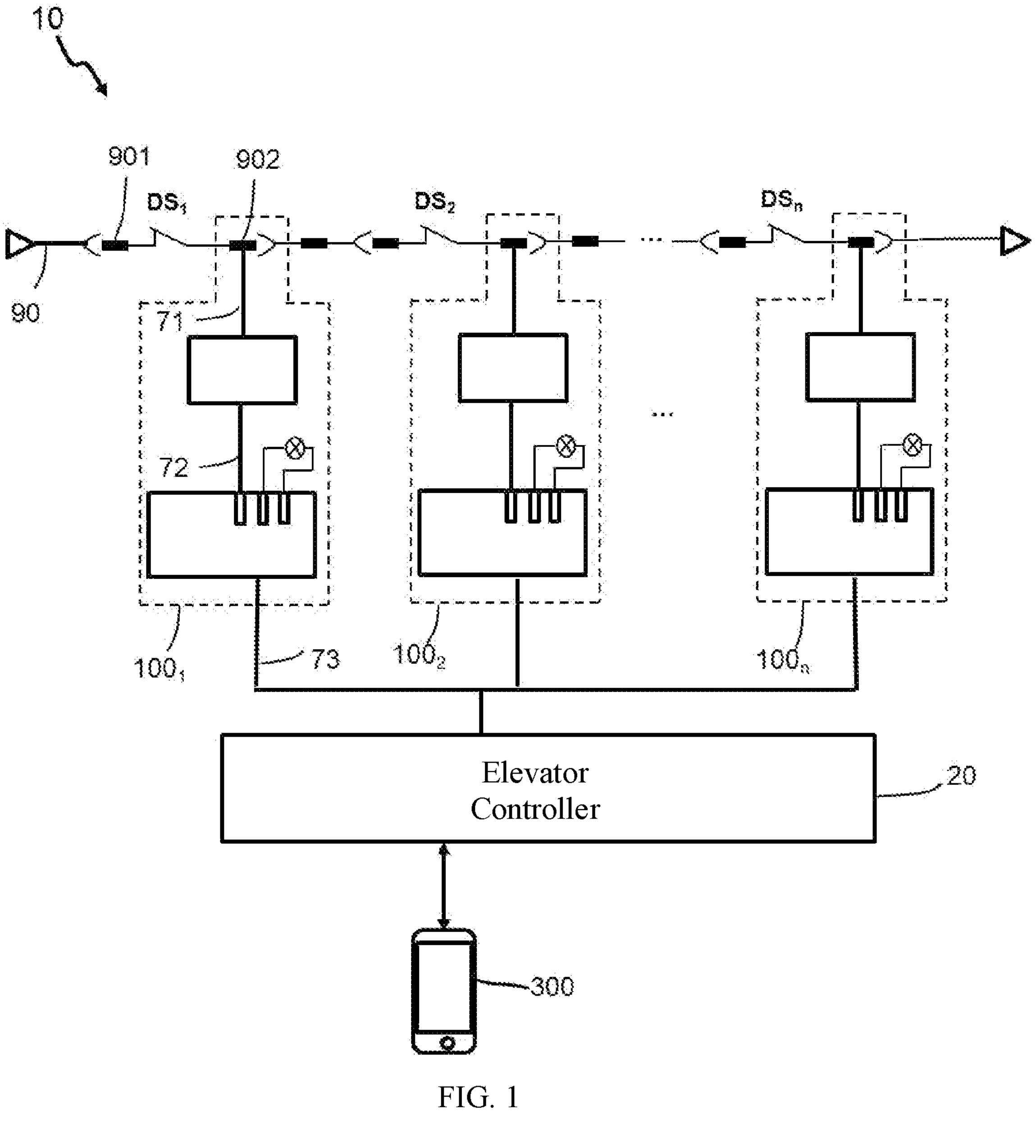
FIG. 1 is a schematic diagram of a basic structure of a fault location system of a landing door safety circuit according to an embodiment of the present disclosure.

The following is a description of exemplary embodiments of the present disclosure, examples of which are illustrated in the drawings. Whenever possible, identical reference numbers will be used throughout the drawings to indicate identical or similar parts.

For brevity and illustrative purposes, the principles of the present disclosure will be described herein mainly with reference to exemplary embodiments thereof. However, those skilled in the art will readily recognize that the same principles may be equivalently applied to various types of fault location units/fault location systems of a landing door safety circuit, and these same principles may be implemented therein. Any such changes do not depart from the true spirit and scope of the present patent application.

Moreover, in the following description, reference is made to the accompanying drawings, which illustrate specific exemplary embodiments. These embodiments may be electrically, mechanically, logically, and structurally modified without departing from the spirit and scope of the present disclosure. In addition, although the feature of the present disclosure is disclosed in conjunction with only one of several implementations/embodiments, this feature may be combined with one or more other features of other implementations/embodiments if such a combination may be desired and/or advantageous for any given or identifiable function. Therefore, the following description should not be considered in a limiting sense, and the scope of the present disclosure is defined by the appended claims and equivalents thereof.

When a component is referred to as being "connected" or "coupled" to another component, it may be directly connected or coupled to said another component or there may be an intervening component.

Figure 2:
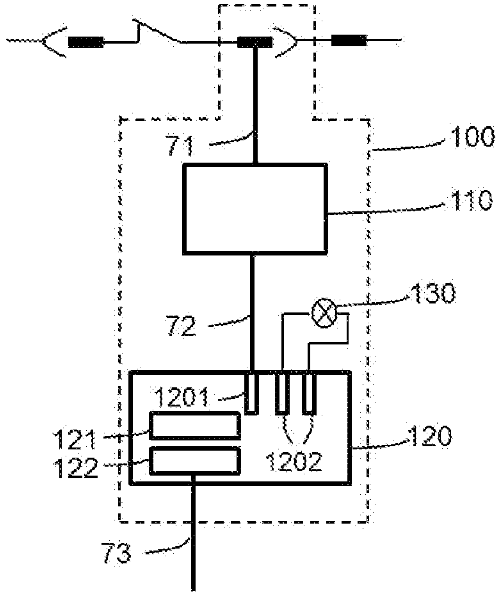
FIG. 2 is a schematic diagram of a basic structure of a fault location unit of a landing door safety circuit according to an embodiment of the present disclosure.

FIG. 1 shows a fault location system 10 of a landing door safety circuit according to an embodiment of the present disclosure, and FIG. 2 shows the specific structure of each fault location unit 100 used in FIG. 1. It will be understood that the fault location system 10 and the fault location units 100 are provided corresponding to an exemplary landing door safety circuit 90 so as to locate which one of n (n is an integer greater than or equal to 2) landings has a landing door locking fault or similar fault when the landing door safety circuit 90 fails.

Referring to FIGS. 1 to 2, the exemplary landing door safety circuit 90 includes a plurality of landing door locking fault monitoring modules connected in series, and each landing door locking fault monitoring module is disposed corresponding to each landing; in an example in which the landing door safety circuit 90 is an ACD4 type safety circuit, a working voltage thereof is 220/110V alternating current (AC). Each landing door locking fault monitoring module works under this AC signal. Once a landing door locking fault or similar fault occurs at a certain landing, the landing door locking fault monitoring module corresponding to this landing will cause, for example, break, which will cause the entire landing door safety circuit 90 to fail. In other examples, the landing door safety circuit 90 can work in, for example, a direct current voltage environment, such as an ACD5 type landing door safety circuit 90.

In a specific embodiment, each landing door locking fault monitoring module may include a landing door switch assembly DS (for example, DS1, DS2, or DSn) as well as a first contact 901 and a second contact 902 electrically connected to both ends of the landing door switch assembly DS, respectively. As shown in FIG. 1, the second contact 902 is closer to an output terminal of the landing door safety circuit 90 than the first contact 901. For example, the first contact 901 may be disposed corresponding to a landing door closed-into-place switch, and the second contact 902 may be disposed corresponding to a mechanical lock hook of the landing door. The landing door switch assembly DS may be a switch component, or two switch components connected in series (not shown in figures). The two switch components connected in series may be respectively used to monitor whether the landing door is closed in place and whether the lock hook of the landing door is locked tightly; of course, according to the monitored aspects, the number of switch components connected in series in the landing door switch assembly DS may be increased. The landing door switch assembly DS may specifically be a normally closed switch, which changes from a normally closed state to an open state when a corresponding landing door fault occurs.

Referring to FIG. 2, the fault location unit 100 disposed corresponding to each landing mainly includes a fault collection circuit 110 and a fault sending component 120; wherein the fault collection circuit 110 is disposed corresponding to the landing door locking fault monitoring module of the landing door safety circuit 90 at a certain landing, and the fault collection circuit 110 may collect a signal 71 indicating landing door locking fault from only the landing door locking fault monitoring module at said certain landing and output a corresponding electrical level signal 72. Specifically, the fault collection circuit 110 may be disposed corresponding to the second contact 902 of each landing door locking fault monitoring module of the landing door safety circuit 90, and the fault collection circuit 110 collects the signal 71 indicating the landing door locking fault from the second contact 902. For example, in the event that the landing door is not closed in place, the landing door switch assembly DS changes from a closed state to an open state, and the AC or DC signal of the landing door locking fault monitoring module changes. This change can be collected and obtained by the fault collection circuit 110.

With continued reference to FIG. 2, the fault sending component 120 may be correspondingly electrically connected to one of the fault collection circuits 110. For example, the fault sending component 120 is electrically connected to the fault collection circuit 110 through a corresponding first port 1201 in a one-to-one correspondence, so that the electrical level signal 72 transmitted from the fault collection circuit 110 can be received by the fault sending component 120; the fault sending component 120 can also send corresponding fault information 73 containing landing information of this landing based on the electrical level signal 72 it received. The electrical level signal 72 may be, for example, a low-voltage DC voltage signal with a voltage lower than 36V, so that it can be easily processed by various signal processing components (such as MCU) operating under low voltage conditions.

Taking into account a general situation in which each landing is configured with a corresponding hall call control panel and the hall call control panel at each landing is connected with an elevator controller of the elevator system, the fault sending component 120 may be implemented in the hall call control panel 120 at a certain landing. Therefore, it is not required to arrange a dedicated fault sending component for the fault location unit 100 at each landing, which is advantageous for the realization of each fault location unit 100 at a low cost. In an embodiment, the hall call control panel 120 may include corresponding components (such as elevator-calling buttons, etc.) for realizing its general hall call function, and may also include the first port 1201, a control module 121, and a communication module 122; the control module 122 may be implemented by existing controller hardware (such as MCU) on the hall call control panel 120, and software configuration can be carried out through the existing controller hardware, so as to realize the generation of the corresponding fault information 73 containing landing information of this landing based on the received electrical level signal 72; the communication module 122 may also be implemented through an existing communication module (for example, a communication interface based on RS-485 serial communication standard) on the hall call control panel 120, which can establish a communication connection with an elevator controller 20 (for example, via RS-485 bus) and send the fault information 73 to the elevator controller 20 of the elevator system.

In an embodiment, the fault location unit 100 further includes a fault indicator 130. When the landing door locking fault monitoring module at a certain landing generates a corresponding signal change in response to the corresponding landing door locking fault, the fault location unit 100 can drive the fault indicator 130 to perform corresponding signal displaying (such as flashing and warning signals), so that the maintenance staff can intuitively observe the occurrence of the landing door locking fault from the fault indicator 130 and easily determine which landing has the landing door locking fault, which is very advantageous for quickly locating the fault on site.

Specifically, the fault indicator 130 may be installed on the fault sending component 120, for example, installed on the hall call control panel 120 and displayed at the landing. Correspondingly, the control module 121 generates a corresponding signal for driving displaying of the fault indicator 130 based on the received electrical level signal 72, so that the fault indicator 130 can intuitively indicate the landing door locking fault or similar faults.

It will be understood that in another alternative embodiment, the fault indicator 130 may also be installed on the fault collection circuit 110, and the fault collection circuit 110 may also generate a corresponding signal for driving displaying of the fault indicator 130 based on the electrical level signal 72.

In an embodiment, the fault collection circuit 110 may be specifically implemented by a voltage adapter, and the corresponding voltage adapter may be selected according to the corresponding type of the landing door safety circuit 90. For example, when the landing door safety circuit 90 operates at a 110V AC voltage, the voltage adapter may have a functional module that converts AC to DC (AC-DC). When the landing door safety circuit 90 operates at a 54V DC voltage, the voltage adapter may have a functional module that converts DC to DC (DC-DC).

Figure 3:
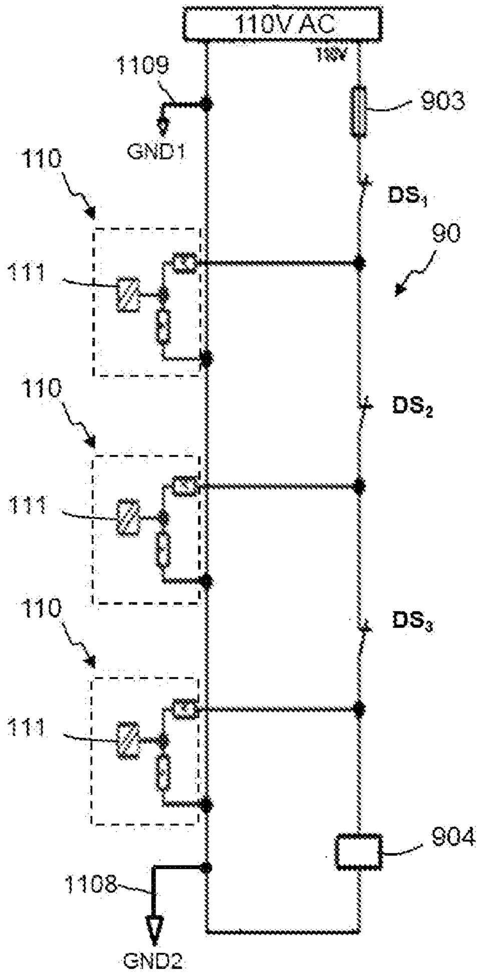
FIG. 3 is a schematic diagram of an equivalent circuit of exemplary fault collection circuits used in the fault location unit of the embodiment shown in FIG. 2.

With reference to FIG. 3, it illustrates a simple equivalent circuit of several (for example, three) fault collection circuits 110 (shown in dashed-line blocks) installed corresponding to the landing door safety circuit 90. The fault collection circuit 110 may be internally provided with, for example, a corresponding protection circuit module, an AC-DC conversion module, etc., and the fault collection circuit 110 is further internally provided with an electric isolation device 111. The fault collection circuit 110 outputs the electrical level signal 72 via the electrical isolation device 111, and the electrical isolation device 111 may optionally be an optoelectronic coupler device or a relay. In this way, the fault collection circuit 110 can realize a physical isolation between the fault sending component 120 (such as the hall call control panel) operating under low voltage conditions and the landing door safety circuit 90 operating under high voltage conditions, which is advantageous for improving the reliability the fault sending component 120 (such as the hall call control panel); of course, the reliability of the output terminal part (for example, a low-voltage output circuit) of the fault collection circuit 110 can also be improved.

With continued reference to FIG. 3, a ground terminal inside the fault collection circuit 110 is electrically connected to a first ground terminal 1109 and a second ground terminal 1108, so that double grounding can be achieved for the ground terminal inside the fault collection circuit 110; for example, it is connected to the ground GND1, and is also connected to the ground GND2. The first ground terminal 1109 may be an existing ground terminal in the landing door safety circuit 90, and the second ground terminal 1108 may be, for example, a ground terminal which introduces the ground signal GND2 from the hall call control panel 120 at the corresponding landing.

Figure 4:
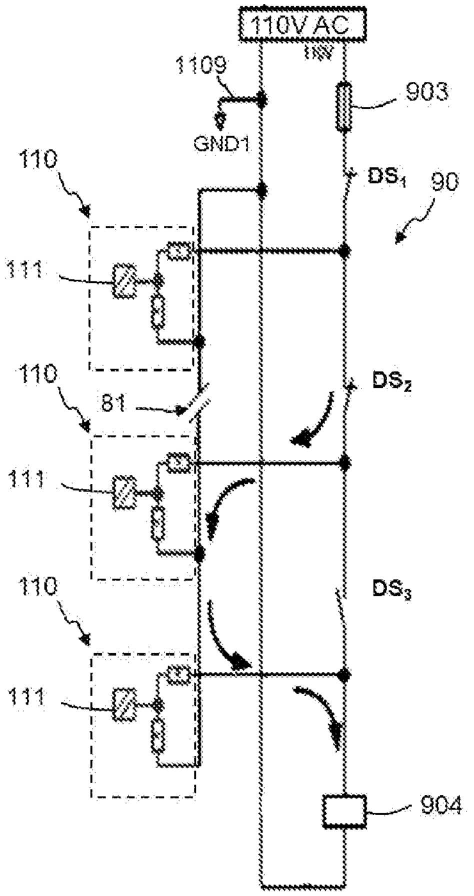
FIG. 4 is a schematic diagram of another equivalent circuit of further exemplary fault collection circuits used in the fault location unit of the embodiment shown in FIG. 2.

FIG. 4 is a schematic diagram showing the layout of further exemplary fault collection circuits 110. For example, the fault collection circuit 110 may be inside provided with a corresponding protection circuit module, an AC-DC conversion module or a DC-DC conversion module, and the electrical isolation device 111. The ground terminal inside the fault collection circuit 110 adopts a single-grounding mode, that is, it is only electrically connected to the first ground terminal 1109, and thus only connected to the ground GND1.

As compared with the single-grounding fault collection circuits 110 shown in FIG. 4, the double-grounding fault collection circuits 110 shown in FIG. 3 can avoid the potential bypass connection problem shown in FIG. 4. As shown in FIG. 4, assuming that the landing door switch assembly DS3 changes from a normally closed state to an open state due to a landing door locking fault at the corresponding landing and the like, in the case of single-grounding failure caused by abnormal opening 81 occurring in the fault collection circuit 110 as shown in FIG. 4, the landing door safety circuit 90 may not fail. For example, the current flows through a current limiting resistor 903, the landing door switch assemblies DS1 and DS2, then through the fault collection circuit 110 disposed corresponding to the landing door switch assembly DS1, the fault collection circuit 110 disposed corresponding to the landing door switch assembly DS2 and a relay 904 to form a loop (see the arrow directions shown in FIG. 4, wherein two fault collection circuits 110 form a bypass of the landing door switch assembly DS3). Therefore, the landing door safety circuit 90 will not fail due to the opening of the landing door switch assembly DS3, and the elevator controller 20 cannot respond to the landing door locking fault in time to suspend the corresponding action of the elevator car, which is very dangerous. In the double-grounding fault collection circuits 110 shown in FIG. 3, even if a single grounding fails, the other grounding can work normally, thereby avoiding the formation of a bypass of a certain corresponding landing door switch assembly DS as shown in FIG. 4, which greatly improves the working reliability of the fault collection circuits 110, and also improves the reliability of the fault location system 10.

With continued reference to FIG. 1, in the fault location system 10, the fault location units 100 at n landings can be all coupled to the elevator controller 20, for example, connected to the elevator controller 20 through the RS-485 bus. The elevator controller 20 can receive the fault information 73 containing the landing information sent from at least one of the fault location units 100 (if the landing corresponding to the fault location unit 100 has a landing door locking fault or a similar fault); since the fault information contains the landing information, the elevator controller 20 is configured to further determine the landing which has the landing door locking fault based on the fault information, which conveniently solves the problem that it is difficult to locate which specific landing has the landing door locking fault or similar fault when the landing door safety circuit 90 fails.

In an embodiment, the fault location system 10 may also include one or more service diagnostic tools or mobile terminal devices 300; the service diagnostic tools or mobile terminal devices 300 may for example be carried by maintenance staff or property management personnel, etc., and the service diagnostic tools or mobile terminal devices 300 may be implemented by portable electronic devices such as smart phones or PADs; the service diagnostic tools or mobile terminal devices 300 may, for example, directly or indirectly communicate with the elevator controller 20. Correspondingly, the elevator controller 20 may be configured to be connected to the service diagnostic tools or mobile terminal devices 300, and can send the landing information of the landing door locking fault to the service diagnostic tools or mobile terminal devices 300. For example, in response to a fault location request from the service diagnostic tools or mobile terminal devices 300, the elevator controller 20 sends the landing information to indicate which landing has the landing door locking fault or similar fault. Therefore, the maintenance staff or property management personnel can easily and quickly know which landing has the landing door locking fault or similar fault remotely.

It will be understood that the above exemplary fault location system 10 can be applied to various elevator systems. If the specific structure of the landing door safety circuit 90 changes, the fault location unit 100 or the fault location system 10 may be accordingly adjusted and changed adaptively in the structure to accurately collect the signal 71 indicating the landing door locking fault.

It should be noted that the overall structure of each fault location unit 100 in the above embodiments is very simple, and the implementation cost is low (especially when implemented with the aid of an existing hall call control panel); moreover, it is also easy to retrofit existing elevator systems; for example, a fault location unit 100 can be added to the landing door locking fault monitoring module of the landing door safety circuit 90 at each landing; in addition, the landing door safety circuit 90 has high reliability, and it is easy to meet the requirements of relevant safety standards of elevator systems. Consequently, the fault location system 10 can also be implemented at a low cost. In a case where the fault location units 100 are disposed for the landing door locking fault monitoring modules of the landing door safety circuit 90 at individual landings in a one-to-one correspondence, the fault location system 10 can locate which landing has the landing door locking fault or similar fault very accurately and conveniently, which is convenient for maintenance.

The above examples mainly illustrate various fault location units and fault location system 10 of the present disclosure. While only some of the embodiments of the present disclosure are described, those skilled in the art will understand that the present disclosure can be carried out in many other forms without departing from the spirit and scope thereof. Therefore, the disclosed examples and embodiments should be considered as illustrative rather than limiting. The present disclosure can cover many variations and replacements without departing from the spirit and scope of the present disclosure defined by the appended claims.

What is claimed is:

1. A fault location system comprising:

a landing door safety circuit comprising a plurality of landing door locking fault monitoring modules connected in series, each of which is disposed corresponding to each landing; and a fault location unit, wherein the fault location unit comprises:

a fault collection circuit, which is disposed corresponding to the landing door locking fault monitoring module of the landing door safety circuit at a certain landing, and which is configured to collect a signal indicating landing door locking fault from only the landing door locking fault monitoring module at said certain landing and output a corresponding electrical level signal; and a fault sending component, which is electrically connected to the fault collection circuit in a one-to-one correspondence, and which is configured to send corresponding fault information containing landing information of the landing based on the received electrical level signal.

2. The fault location system according to claim 1, wherein the fault sending component is implemented in hall call control panel at said certain landing.

3. The fault location system according to claim 2, wherein the hall call control panel comprises:

a first port, which is configured to receive the electrical level signal from the fault collection circuit;

a control module, which is configured to generate corresponding fault information containing landing information of the landing based on the received electrical level signal; and a communication module, which is configured to establish a communication connection with an elevator controller and send the fault information.

4. The fault location system according to claim 3, wherein the fault location unit further comprises a fault indicator disposed on the hall call control panel; and the control module is further configured to generate a corresponding signal for driving displaying of the fault indicator based on the received electrical level signal.

5. The fault location system according to claim 4, wherein the fault location unit further comprises: a second port which is configured to connect with the fault indicator.

6. A fault location unit of a landing door safety circuit, wherein the landing door safety circuit comprises a plurality of landing door locking fault monitoring modules connected in series, each of which is disposed corresponding to each landing; wherein the fault location unit comprises:

a fault collection circuit, which is disposed corresponding to the landing door locking fault monitoring module of the landing door safety circuit at a certain landing, and which is configured to collect a signal indicating landing door locking fault from only the landing door locking fault monitoring module at said certain landing and output a corresponding electrical level signal; and a fault sending component, which is electrically connected to the fault collection circuit in a one-to-one correspondence, and which is configured to send corresponding fault information containing landing information of the landing based on the received electrical level signal;

wherein each of the landing door locking fault monitoring modules comprises a landing door switch assembly, as well as a first contact and a second contact electrically connected to both ends of the landing door switch assembly, and the second contact is closer to an output terminal of the landing door safety circuit than the first contact; and wherein the fault collection circuit collects the signal indicating landing door locking fault from the second contact.

7. The fault location system according to claim 1, wherein the fault collection circuit is implemented through a voltage adapter.

8. The fault location system according to claim 1, wherein an electrical isolation device is disposed inside the fault collection circuit; and wherein the fault collection circuit outputs the electrical level signal via the electrical isolation device.

9. The fault location system according to claim 8, wherein the electrical isolation device is an optoelectronic coupler device or a relay.

10. The fault location system according to claim 1, wherein a ground terminal inside the fault collection circuit is electrically connected to a first ground terminal and a second ground terminal.

11. A fault location system of a landing door safety circuit, comprising:

n fault location units according to claim 1, which are respectively disposed corresponding to the landing door locking fault monitoring modules of the landing door safety circuit at n landings, wherein n is an integer greater than or equal to 2; and an elevator controller, which is coupled to the n fault location units and receives fault information containing landing information sent by one of the fault location units;

wherein the elevator controller is configured to determine the landing where the landing door locking fault occurs based on the fault information containing landing information.

12. The fault location system according to claim 11, wherein the elevator controller is further configured to be connected to a service diagnostic tool or a mobile terminal device and is capable of sending landing information of the landing door locking fault to the service diagnostic tool or the mobile terminal device.

13. A fault location system of a landing door safety circuit, wherein the landing door safety circuit comprises a plurality of landing door locking fault monitoring modules connected in series, each of which is disposed corresponding to each landing, the system comprising:

n fault location units, which are respectively disposed corresponding to the landing door locking fault monitoring modules of the landing door safety circuit at n landings, wherein n is an integer greater than or equal to 2; and an elevator controller, which is coupled to the n fault location units and receives fault information containing landing information sent by one of the n fault location units;

wherein the elevator controller is configured to determine the landing where the landing door locking fault occurs based on the fault information containing the landing information;

wherein each of the n fault location units comprises:

a fault collection circuit, which is disposed corresponding to the landing door locking fault monitoring module of the landing door safety circuit at a certain landing, and which is configured to collect a signal indicating landing door locking fault from only the landing door locking fault monitoring module at said certain landing and output a corresponding electrical level signal; and a fault sending component, which is electrically connected to the fault collection circuit in a one-to-one correspondence, and which is configured to send corresponding fault information containing landing information of the landing based on the received electrical level signal;

wherein each of the landing door locking fault monitoring modules comprises a landing door switch assembly (DS1-n), as well as a first contact and a second contact electrically connected to both ends of the landing door switch assembly (DS1-n), and the second contact is closer to an output terminal of the landing door safety circuit than the first contact; and wherein the fault collection circuit collects the signal indicating landing door locking fault from the second contact.

* * * * *